US012770862B2

(12) United States Patent
Watanabe et al.

(10) Patent No.: US 12,770,862 B2
(45) Date of Patent: Oct. 20, 2026

(54) COMPOSITE PARTICLE, POSITIVE ELECTRODE, ALL-SOLID-STATE BATTERY, AND METHOD FOR PRODUCING COMPOSITE PARTICLE

(71) Applicant: TOYOTA JIDOSHA KABUSHIKI KAISHA, Toyota (JP)

(72) Inventors: Hideaki Watanabe, Nisshin (JP); Masaru Kubota, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 797 days.

(21) Appl. No.: 18/100,235

(22) Filed: Jan. 23, 2023

(65) Prior Publication Data

US 2023/0361280 A1 Nov. 9, 2023

(30) Foreign Application Priority Data

Apr. 4, 2022 (JP) ................................ 2022-062359

(51) Int. Cl.

| | |
|---|---|
| ***H01M 4/36*** | (2006.01) |
| ***H01M 4/02*** | (2006.01) |
| ***H01M 4/505*** | (2010.01) |
| ***H01M 4/525*** | (2010.01) |
| ***H01M 10/0562*** | (2010.01) |

(52) U.S. Cl.

CPC ........... *H01M 4/366* (2013.01); *H01M 4/505* (2013.01); *H01M 4/525* (2013.01); *H01M 10/0562* (2013.01); *H01M 2004/028* (2013.01); *H01M 2300/0068* (2013.01)

(58) Field of Classification Search

None

See application file for complete search history.

(56) References Cited

U.S. PATENT DOCUMENTS

2021/0242491 A1* 8/2021 Kanno .................. C01D 15/00

FOREIGN PATENT DOCUMENTS

| | | | |
|---|---|---|---|
| CN | 112020787 | A | 12/2020 |
| CN | 112420977 | A | 2/2021 |
| JP | 2003-338321 | A | 11/2003 |
| JP | 2010-135090 | A | 6/2010 |
| JP | 2018-206669 | A | 12/2018 |
| JP | 2021-048037 | A | 3/2021 |
| JP | 2022-022446 | A | 2/2022 |
| WO | 2010-064127 | A1 | 6/2010 |

* cited by examiner

*Primary Examiner* — Haroon S. Sheikh

(74) *Attorney, Agent, or Firm* — Dinsmore & Shohl LLP

(57) ABSTRACT

A composite particle includes a positive electrode active material particle and a coating film. The positive electrode active material particle contains a lithium-containing composite oxide having a layered rock salt structure, and the coating film covers at least a part of a surface of the positive electrode active material particle. The coating film contains a phosphate compound, and satisfies a relationship of the following formula (1): $X_P/T \geq 0.04$ (1). In the above formula (1), $X_P$ indicates a mass fraction of phosphorus contained in the composite particle measured by inductively coupled plasma atomic emission spectroscopy, and T indicates a film thickness of the coating film measured by a scanning electron microscope.

11 Claims, 2 Drawing Sheets

COMPOSITE PARTICLE, POSITIVE ELECTRODE, ALL-SOLID-STATE BATTERY, AND METHOD FOR PRODUCING COMPOSITE PARTICLE

CROSS-REFERENCE TO RELATED APPLICATION

This application claims priority to Japanese Patent Application No. 2022-062359 filed on Apr. 4, 2022, incorporated herein by reference in its entirety.

BACKGROUND

1. Technical Field

The present disclosure relates to a composite particle, a positive electrode, an all-solid-state battery and a method for producing the composite particle.

2. Description of Related Art

Japanese Unexamined Patent Application Publication No. 2010-135090 (JP 2010-135090 A) discloses a positive electrode active material that is formed by a gas phase method and that has a reaction suppression unit consisting of a polyanion structure-containing compound containing lithium, and an all-solid-state battery including the positive electrode active material.

SUMMARY

It has been proposed to form a coating film on the surface of a positive electrode active material particle. For example, in the all-solid-state battery described in JP 2010-135090 A, resistance can be reduced due to inhibition of direct contact between a solid electrolyte and the positive electrode active material particle by the coating film.

On the other hand, in the technique described in JP 2010-135090 A, it is considered that the thermal stability of a positive electrode active material layer is not sufficient, that is, the amount of heat generated from an electrode is large. In such a case, the deterioration of the electrode is promoted and a battery capacity is reduced.

Therefore, an object of the present disclosure is to improve the thermal stability of the positive electrode active material layer.

A technical configuration and effects of the present disclosure will be described below. However, an effect mechanism of the present specification includes speculation. The effect mechanism does not limit the technical scope of the present disclosure.

[1] A composite particle includes a positive electrode active material particle and a coating film. The positive electrode active material particle contains a lithium-containing composite oxide having a layered rock salt structure. The coating film covers at least a part of a surface of the positive electrode active material particle. The coating film contains a phosphate compound.

The composite particle satisfies a relationship of the following formula (1).

$$X_P/T \geq 0.04 \quad (1)$$

In the above formula (1), $X_P$ indicates a mass fraction of phosphorus (P) contained in the composite particle measured by inductively coupled plasma atomic emission spectroscopy (ICP-AES), and T indicates a film thickness of the coating film measured by a scanning electron microscope (SEM).

It is known that an all-solid-state battery is less likely to ignite since an organic electrolyte is not used for the all-solid-state battery. On the other hand, in a sulfide all-solid-state battery, a sulfide solid electrolyte reacts with oxygen derived from a positive electrode material, and there is a risk of generating sulfide gas.

The phosphate compound containing lithium phosphate is widely known as a flame retardant. The phosphate compound has been used to suppress heat generation of a conventional lithium ion battery when an abnormality occurs in the battery. For example, it is considered that, for example, oxygen released by a positive electrode in an overcharged state at a high temperature reacts with phosphoric acid, and the sulfide gas can be suppressed from being generated, due to covering of the surface of the positive electrode active material particle with the phosphate compound.

The present inventors have found that the higher the concentration of the phosphoric acid in the composite particle, the lower the amount of heat generated from the electrode. That is, it is expected that heat generation due to oxygen derived from the positive electrode material is suppressed as the amount of P per unit thickness of the coating film is large.

[2] The composite particle may satisfy a relationship of the following formula (2).

$$C_{Li}/C_P \leq 2.5 \quad (2)$$

In the above formula (2), $C_{Li}$ indicates elemental concentration of lithium (Li) obtained from a peak area of a Li1s spectrum measured by X-ray photoelectron spectroscopy, and $C_P$ indicates elemental concentration of P obtained from a peak area of a P2p spectrum measured by the X-ray photoelectron spectroscopy.

[3] The composite particle may have, for example, a coverage rate of 80% or more. The coverage rate is measured by the X-ray photoelectron spectroscopy (XPS).

[4] A positive electrode includes the composite particles described in [1] and a sulfide solid electrolyte.

[5] An all-solid-state battery includes the positive electrode described in [4].

[6] A method for producing a composite particle includes the following (a) and (b).

(a) Prepare a mixture by mixing a coating solution and a positive electrode active material particle.

(b) Produce the composite particle by drying the mixture.

The coating solution contains a solute and a solvent.

The coating film can be generated due to drying of the coating solution adhering to the surface of the positive electrode active material particle. The coating film described in [1] can be generated by the coating solution described in [6].

[7] The solute may contain, for example, a phosphate compound.

The coating solution may satisfy, for example, a relationship of the following formula (3).

$$0 \le n_{Li}/n_P \le 1.5 \quad (3)$$

In the above formula (3),
$n_{Li}$ indicates molar concentration of lithium in the coating solution, and $n_P$ indicates molar concentration of phosphorus in the coating solution.

[8] (b) may include, for example, forming the composite particle by a spray drying method.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
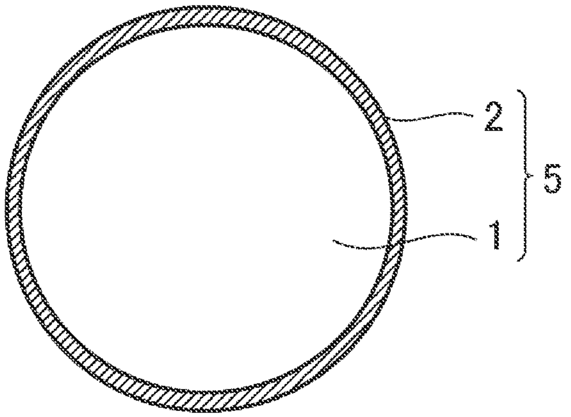
FIG. 1 is a conceptual diagram showing a composite particle in the present embodiment.

Hereinafter, embodiments of the present disclosure (hereinafter can be abbreviated as the "present embodiment") and examples of the present disclosure (hereinafter can be abbreviated as the "present example") will be described. However, the present embodiment and the present example do not limit the technical scope of the present disclosure.

Definitions of Terms

Statements of "comprising," "including," and "having," and variations thereof (for example, "composed of") are open-ended formats. The open-ended format may or may not include an additional element in addition to a required element. A statement of "consisting of" is a closed format. However, even when the statement is the closed format, normally associated impurities and additional elements irrelevant to the disclosed technique are not excluded. A statement "substantially consisting of" is a semi-closed format. The semi-closed format allows addition of an element that does not substantially affect the basic and novel characteristics of the disclosed technique.

Expressions such as "may" and "can" are used in the permissive sense of "having the possibility of" rather than in the obligatory sense of "must".

An element expressed in a singular form also includes plural forms of elements unless otherwise specified. For example, a "particle" can mean not only "one particle" but also "a collection of particles (powder particles, powder, particle group)".

For multiple steps, actions, operations, and the like included in various methods, the execution order thereof is not limited to the described order unless otherwise specified. For example, the multiple steps may proceed concurrently. For example, the multiple steps may occur one after the other.

For example, numerical ranges such as "m % to n %" include upper and lower limit values unless otherwise specified. That is, "m % to n %" indicates a numerical range of "m % or more and n % or less". In addition, "m % or more and n % or less" includes "more than m % and less than n %". Further, a numerical value selected as appropriate from within the numerical range may be used as a new upper limit value or a new lower limit value. For example, a new numerical range may be set by appropriately combining numerical values within the numerical range with numerical values described in other parts of the present specification, tables, drawings, and the like.

When a compound is represented by a stoichiometric composition formula (for example, "$LiCoO_2$"), the stoichiometric composition formula is only a representative example of the compound. The compound may have a non-stoichiometric composition. For example, when lithium cobalt oxide is expressed as "$LiCoO_2$", unless otherwise specified, the lithium cobalt oxide is not limited to a composition ratio of "Li/Co/O=1/1/2", and can include Li, Co and O in any composition ratio. Further, doping with trace elements, substitution, etc. can also be permitted.

"D50" indicates a particle diameter in which the accumulation of the frequency from a side where the particle diameter is small reaches 50% in the volume-based particle diameter distribution. "D50" can be measured by a laser diffraction method. For example, the laser diffraction particle size analyzer "product name: SALD-7500" available from Shimadzu Corporation (or equivalent thereto) may be used.

Measurement by XPS

Composition Ratio of Particle Surface $C_{Li}$ and $C_P$ in the above formula (2) can be measured by the following procedure. An X-ray photoelectron spectroscope (XPS) device is prepared. For example, the XPS device "product name: PHIX-tool" available from ULVAC-PHI, Inc. (or equivalent thereto) may be used. A sample powder consisting of a composite particle is set in the XPS device. The pass energy of 224 eV is used to perform narrow-scan analysis. The measurement data is processed by an analysis software. For example, the analysis software "product name: MulTiPak" available from ULVAC-PHI, Inc. (or equivalent thereto) may be used. The peak area (integral value) of the Li1s spectrum is converted to the elemental concentration of Li ($C_{Li}$). The peak area of the P2p spectrum is converted to the elemental concentration of P ($C_P$). The composition ratio ($C_{Li}/C_P$) of the particle surface is obtained by dividing $C_{Li}$ by $C_P$.

Coverage Rate

The coverage rate is also measured by the XPS. By analyzing the above measurement data, the ratio of each element is obtained from each peak area of C1s, O1s, P2p, and M2p3.

The coverage rate is obtained using the following formula (4).

$$\theta = P/(P+M) \times 100 \quad (4)$$

In the above formula (4), θ indicates the coverage rate (%). P and M indicate the ratio of each element.

Note that "M2p3" and M in the above formula (4) are constituent elements of the positive electrode active material particle and indicate elements other than Li and oxygen (O). That is, the positive electrode active material particle may be represented by the following formula (5).

$LiMO_2$ (5)

M may consist of one element or may consist of a plurality of elements. M may be, for example, at least one selected from the group consisting of nickel (Ni), cobalt (Co), manganese (Mn), and aluminum (Al). When M includes a plurality of elements, the sum of the composition ratio of each element may be 1.

For example, when the positive electrode active material particle is "$LiNi_{1/3}Co_{1/3}Mn_{1/3}O_2$", the above formula (4) can be transformed into the following formula (4').

$$\theta = P/(P+\mathrm{Ni}+\mathrm{Co}+\mathrm{Mn})\times 100 \quad (4')$$

Ni in the above formula (4') indicates the element ratio of Ni obtained from the peak area of Ni2p3. Co indicates the element ratio of Co obtained from the peak area of Co2p3. Mn indicates the element ratio of Mn obtained from the peak area of Mn2p3.

Film Thickness Measurement

T in the above formula (1) can be measured by the following procedure. A sample is prepared by embedding the composite particle in a resin material. The sample is subjected to a cross-sectional process by an ion milling device. For example, the ion milling device "product name: IM4000PLUS" available from Hitachi High-Tech Corporation (or equivalent thereto) may be used. A cross section of the sample is observed by a scanning electron microscope (SEM). For example, the SEM device "product name: Regulus8100" available from Hitachi High-Tech Corporation (or equivalent thereto) may be used. For each of the 10 composite particles, the film thicknesses is measured from 5 points of view. The arithmetic average of a total of film thicknesses at 50 portions is regarded as the film thickness.

Measurement by ICP

Composition Ratio of Positive Electrode Active Material Particle

The composition ratio of the positive electrode active material particle can be measured by the following procedure. A standard solution is prepared by dilution of 0.01 g of the positive electrode active material particle with pure water. An inductively coupled plasma atomic emission spectroscopy (ICP-AES) device is prepared. For example, the ICP-AES device "product name: ICPE-9000" available from Shimadzu Corporation (or equivalent thereto) may be used. The light emission intensity of the standard solution is measured by the ICP-AES device. A calibration curve is created from the light emission intensity of the standard solution. From the light emission intensity of the sample solution and the calibration curve, the molar fraction of the element contained in the positive electrode active material particle is obtained.

P Adhesion Amount

The mass fraction of P ($X_P$) contained in the composite particle can be measured by the following procedure. By mixing hydrochloric acid, nitric acid, and sulfuric acid, a mixed acid is prepared. The mixing ratio is "hydrochloric acid/nitric acid/sulfuric acid=2/3/1 (molar ratio)". By dissolving the composite particle in the mixed acid, solution is prepared. A sample solution is prepared by dilution of 0.01 g of the solution to 100 mL with pure water. An aqueous solution of P (1000 ppm, 10000 ppm) is prepared. A standard solution is prepared by dilution of 0.01 g of the aqueous solution with pure water. The ICP-AES device is prepared. The light emission intensity of the standard solution is measured by the ICP-AES device. A calibration curve is created from the light emission intensity of the standard solution. From the light emission intensity of the sample solution and the calibration curve, the mass fraction of P ($X_P$) contained in the composite particle is obtained. Since P contained in the positive electrode active material particle is not present, or is possibly a very small amount even though the P is present, the mass fraction of P ($X_P$) contained in the composite particle is regarded as the mass fraction of P contained in the coating film.

Mass Concentration of Li, P, And Na in Coating Solution

The mass concentration of Li, P, and Na in the coating solution is measured by the following procedure. 100 ml of a sample solution is prepared by dilution of 0.01 g of the coating solution with pure water. An aqueous solution of Li, P, and Na (1000 ppm, 10000 ppm) is prepared. A standard solution is prepared by dilution of 0.01 g of the aqueous solution with pure water. The ICP-AES device is prepared. The light emission intensity of the standard solution is measured by the ICP-AES device. A calibration curve is created from the light emission intensity of the standard solution. The light emission intensity of the sample solution (diluted solution of the coating solution) is measured by the ICP-AES device. From the light emission intensity of the sample solution and the calibration curve, the mass concentration of Li, P, and Na in the coating solution is obtained. Further, the mass concentration of Li and P is converted into molar concentration. The molar ratio ($n_{Li}/n_P$) is obtained by dividing the molar concentration of Li ($n_{Li}$) by the molar concentration of P ($n_P$).

Composite Particle

FIG. 1 is a conceptual diagram showing the composite particle in the present embodiment. A composite particle 5 can be referred to as, for example, a "covered positive electrode active material" or the like. The composite particle 5 includes a positive electrode active material particle 1 and a coating film 2. The composite particle 5 may form, for example, aggregates. That is, one composite particle 5 may include two or more positive electrode active material particles 1. The composite particle 5 may have, for example, D50 of 1 μm to 50 μm, D50 of 1 μm to 20 μm, or D50 of 5 μm to 15 μm.

The coating film 2 is a shell of the composite particle 5. The coating film 2 covers at least a part of a surface of the positive electrode active material particle 1. The coating film 2 contains a phosphate compound. The coating film 2 contains the phosphate compound, so that suppression of heat generation is expected. The coating film 2 may contain, for example, Li, carbon (C), and the like.

The coating film 2 contains 0.2% to 10% mass fraction of P. The coating film 2 contains 0.2% to 10% mass fraction of P, so that heat generation can be suppressed. In some embodiments, the coating film 2 contains 0.5% to 2.0% mass fraction of P.

In some embodiments of the composite particle 5, the composition ratio ($C_{Li}/C_P$) of the particle surface is 3.5 or less and 2.5 or less (see the above formula (2)). The composition ratio ($C_{Li}/C_P$) is 2.5 or less, so that heat generation can be further suppressed. The composition ratio ($C_{Li}/C_P$) may be, for example, 1.96 or less, 1.73 or less, or 1.64 or less. The composition ratio ($C_{Li}/C_P$) may be zero. The composition ratio ($C_{Li}/C_P$) may be, for example, 0.1 or more, 0.5 or more, or 1.0 or more. The composition ratio ($C_{Li}/C_P$) may be, for example, 1.64 to 3.1.

The coverage rate may be, for example, 80% or more. The coverage rate is 80% or more, so that suppression of heat generation is expected. The coverage rate may be, for example, 82% or more, 84% or more, 85% or more, or 88% or more. The coverage rate may be, for example, 100%, 99% or less, or 95% or less. The coverage rate may be, for example, 80% to 88%.

The coating film 2 has a thickness of 1 nm to 100 nm. The coating film 2 has a thickness of 1 nm to 100 nm, so that resistance can be suppressed while the coating film performs a function as coating. In some embodiments, the coating film 2 has a thickness of 5 nm to 25 nm.

The positive electrode active material particle 1 is a core of the composite particle 5. The positive electrode active material particles 1 may be secondary particles (aggregates of primary particles). The positive electrode active material particle 1 (secondary particle) may have, for example, D50 of 1 μm to 50 μm, D50 of 1 μm to 20 μm, or D50 of 3 μm to 15 μm. When the particle diameter of the positive electrode active material particle 1 is large (for example, more than 50 μm), the resistance may increase.

The positive electrode active material particle 1 can include any component. The positive electrode active material particle 1 contains a lithium-containing composite oxide having a layered rock salt structure. The lithium-containing composite oxide is represented by, for example, the following formula (5).

$Li_aMO_2$ (5)

In the above formula (5), M contains at least one selected from the group consisting of Ni, Co, Mn, and Al, and a may satisfy, for example, the relationship of 0.90□a□1.20. The lithium-containing composite oxide may be, for example, $Li_{1.10}Ni_{1/3}Co_{1/3}Mn_{1/3}O_2$, $Li_{1.10}Ni_{0.50}Co_{0.20}Mn_{0.30}O_2$, $Li_{1.10}Ni_{0.60}Co_{0.20}Mn_{0.20}O_2$, $Li_{1.10}Ni_{0.80}Co_{0.10}Mn_{0.10}O_2$, or the like.

Note that P contained in the positive electrode active material particles 1 is not present, or is a very small amount even though P is present.

All-Solid-State Battery

Figure 2:
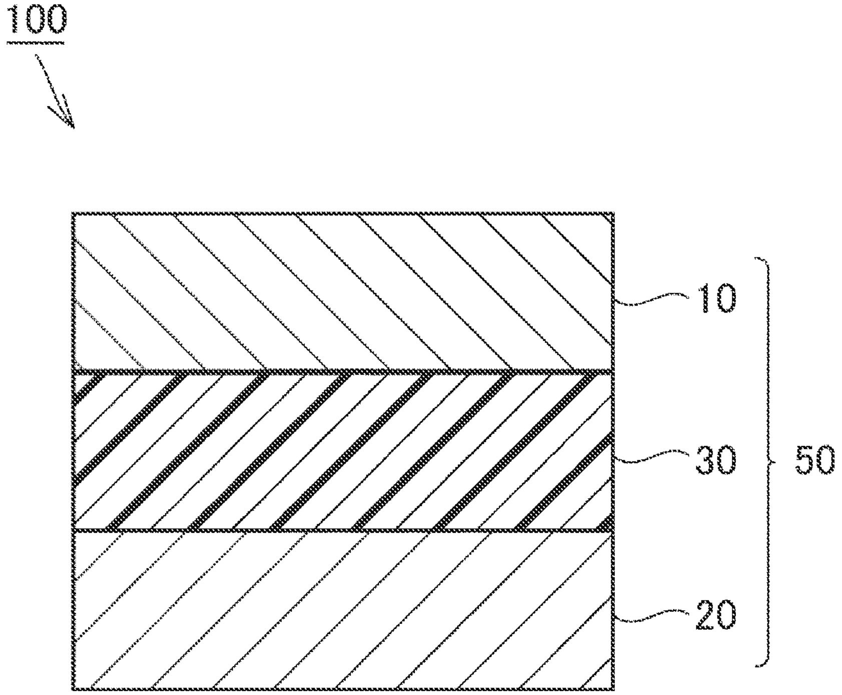
FIG. 2 is a conceptual diagram showing an all-solid-state battery in the present embodiment.

FIG. 2 is a conceptual diagram showing an all-solid-state battery in the present embodiment. An all-solid-state battery 100 may include, for example, an exterior body (not shown). The exterior body may be, for example, a pouch made of an aluminum laminated film. The exterior body may store a power generation element 50. The power generation element 50 includes a positive electrode 10, a separator layer 30, and a negative electrode 20. That is, the all-solid-state battery 100 includes the positive electrode 10, the separator layer 30, and the negative electrode 20.

Positive Electrode

The positive electrode 10 is layered. The positive electrode 10 may include, for example, a positive electrode active material layer and a positive electrode current collector. For example, the positive electrode active material layer may be formed by coating of a positive electrode composite material on the surface of the positive electrode current collector. The positive electrode current collector may include, for example, an aluminum (Al) foil or the like. The positive electrode current collector may have, for example, a thickness of 5 μm to 50 μm.

The positive electrode active material layer may have, for example, a thickness of 10 μm to 200 μm. The positive electrode active material layer adheres closely to the separator layer 30. The positive electrode active material layer includes the positive electrode composite material. The positive electrode composite material includes the composite particle and the sulfide solid electrolyte. That is, the positive electrode 10 includes the composite particle and the sulfide solid electrolyte. Details of the composite particle are as described above.

The sulfide solid electrolyte can form an ion conduction path in the positive electrode active material layer. The blending amount of the sulfide solid electrolyte may be, for example, 1 to 200 parts by volume, 50 to 150 parts by volume, or 50 to 100 parts by volume, with respect to 100 parts by volume of the composite particle (positive electrode active material). The sulfide solid electrolyte contains, for example, Li, P, and sulfur(S). The sulfide solid electrolyte may further contain, for example, O, silicon (Si), and the like. The sulfide solid electrolyte may further contain, for example, halogen and the like. The sulfide solid electrolyte may further contain, for example, iodine (I), bromine (Br), and the like. The sulfide solid electrolyte may be, for example, glass ceramics or argyrodite. The sulfide solid electrolyte may contain at least one selected from the group consisting of, for example, LiI—LiBr—$Li_3PS_4$, $Li_2S$—$SiS_2$, LiI—$Li_2S$—$SiS_2$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, $Li_2S$—$P_2S_5$, and $Li_3PS_4$.

The positive electrode active material layer may further include, for example, a conductive material. The conductive material can form an electron conduction path in the positive electrode active material layer. The blending amount of the conductive material may be, for example, 0.1 to 10 parts by mass with respect to 100 parts by mass of the composite particle (positive electrode active material). The conductive material can contain any component. The conductive material may contain at least one selected from the group consisting of, for example, carbon black, vapor growth carbon fiber (VGCF), a carbon nanotube (CNT), and a graphene flake.

The positive electrode active material layer may further include, for example, a binder. The blending amount of the binder may be, for example, 0.1 to 10 parts by mass with respect to 100 parts by mass of the composite particle (positive electrode active material). The binder can contain any component. The binder may contain at least one selected from the group consisting of, for example, polyvinylidene fluoride (PVdF), vinylidene fluoride-hexafluoropropylene copolymer (PVDF-HFP), styrene butadiene rubber (SBR), and polytetrafluoroethylene (PTFE).

Negative Electrode

The negative electrode 20 is a counter electrode of the positive electrode 10. The negative electrode 20 is layered. The negative electrode 20 may include, for example, a negative electrode active material layer and a negative electrode current collector. For example, the negative electrode active material layer may be formed by coating of a negative electrode composite material on the surface of the negative electrode current collector. The negative electrode current collector may contain, for example, a copper (Cu) foil, an Ni foil, and the like. The negative electrode current collector may have, for example, a thickness of 5 μm to 50 μm.

The negative electrode active material layer may have, for example, a thickness of 10 μm to 200 μm. The negative electrode active material layer adheres closely to the separator layer 30. The negative electrode active material layer includes the negative electrode composite material. The negative electrode composite material includes the negative electrode active material particle and the sulfide solid electrolyte. The negative electrode composite material may further include the conductive material and the binder. The sulfide solid electrolytes may be the same as or different from each other between the negative electrode composite material and the positive electrode composite material. The negative electrode active material particle can contain any component. The negative electrode active material particle may contain at least one selected from the group consisting of, for example, graphite, Si, silicon oxide [$SiO_x(0<x<2)$], and $Li_4Ti_5O_{12}$.

Separator Layer

The separator layer 30 is interposed between the positive electrode 10 and the negative electrode 20. The separator layer 30 separates the positive electrode 10 from the negative electrode 20. The separator layer 30 includes the sulfide solid electrolyte. The separator layer 30 may further include the binder. The sulfide solid electrolytes may be the same as or different from each other between the separator layer 30 and the positive electrode composite material. The sulfide solid electrolytes may be the same as or different from each other between the separator layer 30 and the negative electrode composite material.

Method for Producing Composite Particle

Figure 3:
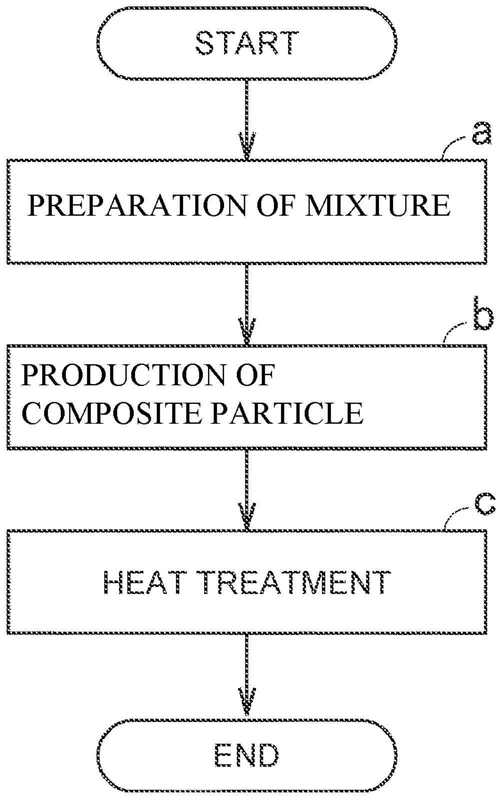
FIG. 3 is a schematic flowchart of a method for producing the composite particle in the present embodiment.

FIG. 3 is a schematic flowchart of a method for producing the composite particle in the present embodiment. Hereinafter, the "method for producing the composite particle according to the present embodiment" can be abbreviated as the "production method". The production method includes "(a) preparation of mixture" and "(b) production of composite particle". The production method may further include, for example, "(c) heat treatment" and the like.

(a) Preparation of Mixture

The production method includes preparing a mixture by mixing the coating solution and the positive electrode active material particle. Details of the positive electrode active material particle are as described above. The mixture may be, for example, a suspension or a wet powder. For example, the suspension may be formed by dispersion of the positive electrode active material particle (powder) in the coating solution. For example, the wet powder may be formed by spraying of the coating solution in the powder. In the production method, any mixing device, granulating device, or the like can be used.

The coating solution contains a solute and a solvent. The solute includes a film material (raw material for the coating film). The coating solution may further include, for example, a suspended solid (insoluble component), a precipitate, and the like.

The amount of the solute may be, for example, 0.1 to 20 parts by mass, 1 to 15 parts by mass, or 5 to 10 parts by mass with respect to 100 parts by mass of the solvent. The solvent can contain any component as long as the solute is dissolved. The solvent may contain, for example, water, alcohol, or the like. The solvent may contain, for example, ion-exchanged water or the like.

The solute may contain, for example, the phosphate compound. Thereby, the solute can contain P. The phosphate compound may be at least one selected from the group consisting of, for example, phosphoric anhydride ($P_2O_5$), orthophosphoric acid, pyrophosphoric acid, metaphosphoric acid [$(HPO_3)_n$], and polyphosphoric acid. The phosphate compound may be at least one selected from the group consisting of, for example, the metaphosphoric acid and the polyphosphoric acid. The metaphosphoric acid and the polyphosphoric acid can have a longer molecular chain than other phosphate compounds. The phosphate compound has a longer molecular chain, so that it is considered that the coating film having continuity is likely to be generated. When the coating film has continuity, for example, an improvement in the coverage rate is expected.

The solute may further contain sodium (Na). Na is dissolved in the coating solution, so that the stability of the phosphate compound may further improve. The concentration of Na in the coating solution (mass concentration) may be, for example, 0% to 1%. The concentration of Na may be, for example, 0.6% or less, or 0.5% or less. The concentration of Na may be, for example, 0.5% to 0.6%.

The solute may further contain a lithium compound. The solute may contain, for example, lithium hydroxide, lithium carbonate, lithium nitrate, and the like. The molar ratio of Li to P ($n_{Li}/n_P$) may be, for example, 1.5 or less [see the above formula (3)]. The molar ratio ($n_{Li}/n_P$) is 1.5 or less, so that decrease in the composition ratio ($C_{Li}/C_P$) of the particle surface is expected. The molar ratio ($n_{Li}/n_P$) may be, for example, 0.75 or less, 0.30 or less, or zero. The molar ratio ($n_{Li}/n_P$) may be, for example, 0 to 0.30 or 0.30 to 1.5.

(b) Production of Composite Particle

The production method includes production of the composite particle by drying the mixture. The coating film is generated due to drying of the coating solution adhering to the surface of the positive electrode active material particle. In the production method, any drying method can be used.

For example, the composite particle may be formed by the spray drying method. That is, droplet is formed by spraying of the suspension from a nozzle. The droplet includes the positive electrode active material particle and the coating solution. For example, the composite particle can be formed by drying of the droplet with hot air. By using the spray drying method, for example, an improvement in the coverage rate is expected.

The solid content of the suspension for spray drying may be, for example, 1% to 50% volume fraction or 10% to 30% volume fraction. The nozzle diameter may be, for example, 0.1 mm to 10 mm or 0.1 mm to 1 mm. The hot air temperature may be, for example, 100° C. to 200° C.

For example, the composite particle may be produced by a rolling fluidized bed coating machine. In the rolling fluidized bed coating machine, "(a) preparation of mixture" and "(b) production of composite particle" can be performed simultaneously.

(c) Heat Treatment

The production method may include subjecting the composite particle to heat treatment. The coating film can be fixed by the heat treatment. The heat treatment can also be referred to as "firing". In the production method, any heat treatment device can be used. The heat treatment temperature may be, for example, 150° C. to 300° C. The heat treatment time may be, for example, 1 hour to 10 hours. For example, the heat treatment may be performed in air, or the heat treatment may be performed in an inert atmosphere.

Hereinafter, the present embodiment will be described using the present example, but the present embodiment is not limited thereto.

Production of Positive Electrode Active Material Particles

Positive electrode active material particles A to C, which are lithium-containing composite oxides each having a layered rock salt structure, were produced as follows.

Positive Electrode Active Material Particle A

Nickel(II) sulfate hexahydrate ($NiSO_4 \cdot 6H_2O$), cobalt (II) sulfate heptahydrate ($CoSO_4 \cdot 7H_2O$), and manganese (II) sulfate pentahydrate ($MnSO_4 \cdot 5H_2O$) were dissolved in pure water to obtain a raw material aqueous solution. The molar ratio of Ni, Co, and Mn in the raw material aqueous solution was 1:1:1, and the total molar concentration of Ni, Co, and Mn in the raw material aqueous solution was 1.8 mol/L.

1 L of aqueous ammonia solution with the ammonia concentration of 10 g/L was prepared in a reaction vessel. Precipitation was formed by adjustment of the pH such that the pH is within 11.20±0.2 using a sodium hydroxide aqueous solution while 1 L of the raw material aqueous solution was added dropwise to the reaction vessel at a speed of 5.2 mL/min, and a precursor was obtained. From the start to the end of the precipitation reaction, the ammonia aqueous solution was appropriately added such that the ammonia concentration of the reaction solution was 10 g/L.

Lithium carbonate ($Li_2CO_3$) was mixed with the precursor such that the molar ratio of Li to Ni, Co, and Mn was 1.10, and the mixture was fired at 800° C. for 5 hours in an oxygen atmosphere to obtain a positive electrode active material particle A. According to the above-described procedure, the composition of the positive electrode active material particle A and D50 were measured. The composition of the positive electrode active material particle A was $Li_{1.10}Ni_{1/3}Co_{1/3}Mn_{1/3}O_2$, and D50 was 5.0 μm.

Positive Electrode Active Material Particles B to C

Except that the precursor was obtained by adjusting the precipitation formation time such that D50 was 3.0 μm, the positive electrode active material particle B was obtained in the same manner as the positive electrode active material particle A. Except that the precursor was obtained by adjusting the precipitation formation time such that D50 was 20.0 μm, the positive electrode active material particle C was obtained in the same manner as the positive electrode active material particle A. According to the above-described procedure, the composition of each of the positive electrode active material particles B to C was measured. The composition of each of the positive electrode active material particles B to C was $Li_{1.10}Ni_{1/3}Co_{1/3}Mn_{1/3}O_2$.

Production of All-Solid-State Battery

Composite particles, positive electrodes, and all-solid-state batteries according to Nos. 1 to 7 were produced as follows. Hereinafter, for example, a "composite particle according to No. 1" can be abbreviated as "No. 1".

No. 1

Coating Solution

A coating solution was prepared by dissolving 10.8 parts by mass of metaphosphoric acid (available from FUJIFILM Wako Pure Chemical Corporation) in 166 parts by mass of ion-exchanged water. Further, lithium hydroxide monohydrate ($LiOH{\cdot}H_2O$) was dissolved in the coating solution such that the molar ratio ($n_{Li}/n_P$) was 0.75.

Positive Electrode

The positive electrode active material particle A was prepared. A suspension was prepared by dispersion of 50 parts by mass of powder of the positive electrode active material particle in 53.7 parts by mass of the coating solution. The spray dryer "product name: Mini Spray Dryer B-290" available from BUCHI was prepared. Powder of the composite particle was produced by supply of the suspension to the spray dryer. The air supply temperature of the spray dryer was 200° C., and the air supply volume was 0.45 $m^3$/min. The composite particle was subjected to heat treatment in the air. The heat treatment temperature was 200° C. The heat treatment time was 5 hours. According to the above-described procedure, the composition ratio ($C_{Li}/C_P$) of the particle surface, the mass fraction of P ($X_P$), and the film thickness (T) and the coverage rate of the coating film were measured. Further, $X_P/T$ was measured from the measured $X_P$ and T. The results are shown in Table 1 below. In Nos. 2 to 7 described below, the composition ratio ($C_{Li}/C_P$) of the particle surface, the mass fraction of P ($X_P$), and the film thickness (T) and the coverage rate of the coating film are similarly measured.

The following materials were prepared.

Sulfide solid electrolyte: $Li_2S$—$P_2S_5$ glass ceramic containing LiI (D50: 0.8 μm)

Conductive material: VGCF

Binder: SBR

Dispersion medium: Heptane

Positive electrode current collector: Al foil

The composite particle and the sulfide solid electrolyte were prepared. The composite particle and the sulfide solid electrolyte were weighed in a glove box filled with argon (Ar) gas (dew point: −30° C.). By mixing the above, the conductive material, the binder, and the dispersion medium, a positive electrode slurry was prepared. The mixing ratio was "composite particle/sulfide solid electrolyte=6/4 (volume ratio)". The blending amount of the conductive material was 3 parts by mass with respect to 100 parts by mass of the composite particle. The blending amount of the binder was 0.7 parts by mass with respect to 100 parts by mass of the composite particle. The positive electrode slurry was sufficiently stirred by the ultrasonic homogenizer "Model UH-50" available from SMT Co., Ltd. A paint film was formed by painting of the positive electrode slurry on the surface of the positive electrode current collector. The paint film was dried at 100° C. for 30 minutes by a hot plate. As a result, the positive electrode raw material was produced. A disk-shaped positive electrode was cut out from the positive electrode raw material. The area of the positive electrode was 1 $cm^2$.

Negative Electrode

As the sulfide solid electrolyte, the conductive material, the binder, and the dispersion medium, materials similar to those of the positive electrode were prepared. As a stirring device, the stirring device (product name: "FILMIX", model "30-L") available from PRIMIX Corporation was prepared. The sulfide solid electrolyte, the conductive material, the binder, and the dispersion medium were introduced into a stirring vessel of the stirring device. The materials in the stirring vessel were stirred for 30 minutes at a rotation speed of 20000 rpm.

$Li_4Ti_5O_{12}$ (D50: 1.0 μm) as the negative electrode active material particle and the Cu foil as the negative electrode current collector were prepared. The negative electrode active material particle was additionally introduced into the stirring vessel. Stirring was performed at 15000 rpm for 60 minutes. The mixing ratio between the negative electrode active material particle and the sulfide solid electrolyte was "composite particle/sulfide solid electrolyte=7/3 (volume ratio)". The blending amount of the conductive material was 1 part by mass with respect to 100 parts by mass of the composite particle. The blending amount of the binder was 2 parts by mass with respect to 100 parts by mass of the composite particle. After the negative electrode active material particle was introduced into the stirring vessel, the materials in the stirring vessel were stirred for 60 minutes at a rotation speed of 15000 rpm, and a negative electrode slurry was prepared. A paint film was formed by painting of the negative electrode slurry on the surface of the negative electrode current collector. The paint film was dried at 100° C. for 30 minutes by a hot plate. As a result, the negative electrode raw material was produced. A disk-shaped negative electrode was cut out from the negative electrode raw material. The area of the negative electrode was 1 $cm^2$.

Separator Layer

As the sulfide solid electrolyte, $Li_2S$—$P_2S_5$ glass ceramic (D50: 2.5 μm) containing LiI was prepared. As a mold for press working, a tubular ceramic with an inner diameter cross-sectional area of 1 $cm^2$ was prepared. 64.8 mg of the sulfide solid electrolyte was placed in the mold, smoothed, and then pressed and hardened with a pressure of 1 ton/$cm^2$ to obtain a separator layer.

All-Solid-State Battery

In the mold, the positive electrode was arranged on one side of the separator layer and the negative electrode was arranged on the other side of the separator layer. The negative electrode, the separator layer, and the positive electrode were pressed together for 1 minute at a pressure of 6 tons/$cm^2$. A power generation element was formed by inserting a stainless steel rod into the positive and negative electrodes and restraining the stainless steel rod at 0.5 tons/$cm^2$. As a housing, a pouch made of an aluminum laminated film was prepared. The battery element was enclosed in the housing. Thereby, an all-solid-state battery was formed.

No. 2

The positive electrode active material particle A was prepared. A coating solution was prepared by dissolving 10.8 parts by mass of metaphosphoric acid (available from FUJIFILM Wako Pure Chemical Corporation) in 166 parts by mass of ion-exchanged water. Further, lithium hydroxide monohydrate was dissolved in the coating solution such that the molar ratio ($n_{Li}/n_P$) was 0.30. Subsequently, as in No. 1, the composite particle, the positive electrode, and the all-solid-state battery were produced.

No. 3

The positive electrode active material particle A was prepared. A coating solution was prepared by dissolving 10.8 parts by mass of metaphosphoric acid (available from FUJIFILM Wako Pure Chemical Corporation) in 166 parts by mass of ion-exchanged water. Lithium hydroxide monohydrate was not added to the coating solution. Subsequently, as in No. 1, the composite particle, the positive electrode, and the all-solid-state battery were produced.

No. 4

The positive electrode active material particle B was prepared. A coating solution was prepared by dissolving 10.8 parts by mass of metaphosphoric acid (available from FUJIFILM Wako Pure Chemical Corporation) in 166 parts by mass of ion-exchanged water. Lithium hydroxide monohydrate was not added to the coating solution. Subsequently, as in No. 1, the composite particle, the positive electrode, and the all-solid-state battery were produced.

No. 5

The positive electrode active material particle A was prepared. A coating solution was prepared by dissolving 10.8 parts by mass of metaphosphoric acid (available from FUJIFILM Wako Pure Chemical Corporation) in 166 parts by mass of ion-exchanged water. Further, lithium hydroxide monohydrate was dissolved in the coating solution such that the molar ratio ($n_{Li}/n_P$) was 1.50. Subsequently, as in No. 1, the composite particle, the positive electrode, and the all-solid-state battery were produced.

No. 6

The positive electrode active material particle C was prepared. A coating solution was prepared by dissolving 10.8 parts by mass of metaphosphoric acid (available from FUJIFILM Wako Pure Chemical Corporation) in 166 parts by mass of ion-exchanged water. Further, lithium nitrate ($LiNO_3$) was dissolved in the coating solution such that the molar ratio ($n_{Li}/n_P$) was 2.00. Subsequently, as in No. 1, the composite particle, the positive electrode, and the all-solid-state battery were produced.

No. 7

The positive electrode active material particle C was prepared. A coating solution was prepared by dissolving 10.8 parts by mass of metaphosphoric acid (available from FUJIFILM Wako Pure Chemical Corporation) in 166 parts by mass of ion-exchanged water. Further, lithium nitrate was dissolved in the coating solution such that the molar ratio ($n_{Li}/n_P$) was 0.30. Subsequently, as in No. 1, the composite particle, the positive electrode, and the all-solid-state battery were produced.

Evaluation

The capacity of the evaluation battery was confirmed by constant current-constant voltage charging and constant current discharging. The time rate of charging and discharging was 1/3 C. "C" is a symbol indicating the time rate. At the time rate of 1C, the full charging capacity of the battery is discharged in 1 hour.

The state of charge (SOC) of the evaluation battery was adjusted to 100% (voltage: 3.0 V) by the time rate of 1/3 C. After adjusting the SOC, each all-solid-state battery was dismantled in the glove box filled with Ar gas (dew point: −70° C.) and the positive electrode was collected. The collected positive electrode was cut, 3 mg of the positive electrode was introduced into a pressure-resistant stainless steel container, and a lid was crimped and sealed. The pressure-resistant stainless steel container was taken out of the glove box, the differential scanning calorimetry (DSC) device "product name: DSC7000X" available from Hitachi High-Tech Corporation was used to raise the temperature from the room temperature to 500° C. at the temperature raising speed of 1° C./min under a helium (He) gas flow, and the heat generation amount was measured. The results are shown in Table 1 below.

TABLE 1

| | | Composite particle | | | | |
|---|---|---|---|---|---|---|
| No. | Positive electrode active material particle | Coating solution Molar ratio by ICP ($n_{Li}/n_P$) | Particle surface composition ratio by XPS ($C_{Li}/C_P$) | Mass by ICP/Film thickness by SEM ($X_P/T$) | Coverage rate by XPS [%] | All-solid-state battery Heat generation amount (J/g) |
| 1 | A | 0.75 | 2.50 | 0.04 | 85 | 326 |
| 2 | A | 0.30 | 1.96 | 0.12 | 84 | 307 |
| 3 | A | 0 | 1.73 | 0.20 | 88 | 273 |
| 4 | B | 0 | 1.64 | 0.25 | 82 | 319 |
| 5 | A | 1.50 | 3.10 | 0.05 | 80 | 341 |
| 6 | C | 2.00 | 2.87 | 0.01 | 63 | 584 |
| 7 | C | 0.30 | 2.44 | 0.03 | 76 | 454 |

Result

In Nos. 1 to 5 in which the mass fraction of P ($X_P/T$) contained in the composite particle measured by the ICP-AES with respect to the film thickness of the coating film measured by the SEM is 0.04 or more, the heat generation amount is reduced. Further, in Nos. 1 to 4 in which the composition ratio ($C_{Li}/C_P$) of the particle surface is 2.5 or less, the heat generation amount is further reduced. The coverage rate in Nos. 1 to 5 is 80% or more, which is considered to contribute to the reduction of the heat generation amount.

In Nos. 6 and 7 in which the mass fraction of P ($X_P/T$) contained in the composite particle measured by the ICP-AES with respect to the film thickness of the coating film measured by the SEM is less than 0.04, the heat generation amount is increased. Further, the coverage rate in Nos. 6 and 7 is less than 80%, which is considered to affect the increase in the heat generation amount.

The present embodiment and the present example are illustrative in all respects. The present embodiment and the present example are not restrictive. The technical scope of the present disclosure includes all changes within the meaning and range equivalent to the description of the claims. For example, from the beginning, it is planned to extract an appropriate configuration from the present embodiment and the present example and combine them as appropriate.

What is claimed is:

1. A composite particle comprising a positive electrode active material particle and a coating film, wherein:

the positive electrode active material particle contains a lithium-containing composite oxide having a layered rock salt structure;

the coating film covers at least a part of a surface of the positive electrode active material particle;

the coating film contains a phosphate compound;

the composite particle comprises a coverage rate of 80% or more, wherein the coverage rate is measured by X-ray photoelectron spectroscopy;

the composite particle satisfies a relationship of the following formula (1): $X_P/T \geq 0.04$ (1), where in the above formula (1), $X_P$ indicates a mass fraction of phosphorus contained in the composite particle measured by inductively coupled plasma atomic emission spectroscopy, and T indicates a film thickness of the coating film measured by a scanning electron microscope; and the composite particle satisfies a relationship of the following formula (2): $C_{Li}/C_P \leq 2.5$ (2), where in the above formula (2), $C_{Li}$ indicates elemental concentration of lithium obtained from a peak area of a Li1s spectrum measured by X-ray photoelectron spectroscopy, and $C_P$ indicates elemental concentration of phosphorus obtained from a peak area of a P2p spectrum measured by the X-ray photoelectron spectroscopy.

2. The composite particle according to claim 1, wherein the positive electrode active material particle has a D50 of 1 μm to 5 μm.

3. The composite particle according to claim 1, wherein the coating film has a thickness from 1 nm to 100 nm.

4. The composite particle according to claim 1, wherein:

the positive electrode active material particle has a D50 of 1 μm to 5 μm; and the coating film has a thickness from 1 nm to 100 nm.

5. The composite particle according to claim 1, wherein $1.0 \leq C_{Li}/C_P \leq 2.5$.

6. The composite particle according to claim 1, wherein the coating film does not contain lithium.

7. A positive electrode comprising the composite particle according to claim 1 and a sulfide solid electrolyte.

8. An all-solid-state battery comprising the positive electrode according to claim 7.

9. A method for producing the composite particle of claim 1, the method comprising:

(a) preparing a mixture by mixing a coating solution and the positive electrode active material particle; and (b) producing the composite particle by drying the mixture, wherein the coating solution contains a solute and a solvent.

10. The method according to claim 9, wherein:

the solute contains the phosphate compound;

the coating solution satisfies a relationship of the following formula (3): $0 \leq n_{Li}/n_P \leq 1.5$ (3); and in the above formula (3), $n_{Li}$ indicates molar concentration of lithium in the coating solution, and $n_P$ indicates molar concentration of phosphorus in the coating solution.

11. The method according to claim 9, wherein (b) includes forming the composite particle by a spray drying method.

* * * * *